US 7,124,357 B1

(12) United States Patent
Orr

(10) Patent No.: US 7,124,357 B1
(45) Date of Patent: Oct. 17, 2006

(54) SCREEN MAKER

(76) Inventor: Joseph K. Orr, 328 Flatbush PMB 219, Brooklyn, NY (US) 11238

( * ) Notice: Subject to any disclaimer, the term of this patent is extended or adjusted under 35 U.S.C. 154(b) by 1144 days.

(21) Appl. No.: 09/584,631

(22) Filed: May 31, 2000

(51) Int. Cl.
G06F 15/00 (2006.01)
(52) U.S. Cl. ...................... 715/513; 715/526; 707/104; 719/318
(58) Field of Classification Search ................ 434/350, 434/335, 323, 322, 236, 118; 715/704, 513, 715/530, 500, 512; 707/3; 345/1.3, 206, 345/473, 581, 776; 705/27
See application file for complete search history.

(56) References Cited

U.S. PATENT DOCUMENTS

| | | | | |
|---|---|---|---|---|
| 4,772,206 A | * | 9/1988 | Kerr et al. | 434/118 |
| 5,781,785 A | * | 7/1998 | Rowe et al. | 715/513 |
| 6,041,335 A | * | 3/2000 | Merritt et al. | 715/512 |
| 6,404,441 B1 | * | 6/2002 | Chailleux | 715/704 |
| 6,684,369 B1 | * | 1/2004 | Bernardo et al. | 715/513 |
| 2001/0039552 A1 | * | 11/2001 | Kili et al. | 707/500 |
| 2003/0208473 A1 | * | 11/2003 | Lennon | 707/3 |

OTHER PUBLICATIONS

U.S. Appl. No. 60/180,356.*
Matthews et al. Complete Reference FrontPage 2000 Pulic Release 1999 by Osborn/MacGraw-Hill, pp. 64-67, 81-98, 104-117, 129-142, 170-176, 222-230, 342-353, 373, 399-416, 437-441, 450-453, 460-462,525-526, 761-776, 853-855.*
Matthews et al. "Complete Reference FrontPage 2000" (Public Release May 1, 1999, By Osborn/McGraw-Hill, Ca, USA), pp. 63-69, 80-99, 103-105, 168-177, 222 through 231, 341-343, 372-375, 459-463, 507-50-, 518-521, 524-525,634-635, 760-767.*
Matthews et al. "Complete Reference FrontPage 2000" (Public Release May 1, 1999, By Osborn/McGraw-Hill, Ca, USA), pp. 63-69, 80-99, 103-105, 168-177, 222 through 231, 341-343, 372-375, 459-463, 507-509, 518-521, 524-525,634-635, 760-767.*
Bernadette Houghton "finds a screen capture program SnagIt/32 4.1" Published Feb. 1998 see URL http://www.melbpc.org.au/pcupdate/9802/9802article3.htm pp. 1-2.*

* cited by examiner

Primary Examiner—William Bashore
Assistant Examiner—Quoc A. Tran
(74) Attorney, Agent, or Firm—Milde & Hoffberg LLP

(57) ABSTRACT

A computer program and method for the direct creation of a page having text and image. The program accepts input of text, and the input of an image and directly combines the text and image to a page in an internet common language. The invention also provides a testing method which allows the retrieval of a portion of a previously created master page, provides program code to allow a student to input data in response to the retrieved portion and to directly create an answer page. Program code also allows the master page and the answer page to be retrieved and compared.

A system and method for on-line creation, storage and retrieval of books or pages on books having pages with text and related images. The system can also provide for the on-line testing by the retrieval of a portion the pages of a master book and the creation of an answer page, and permit the comparison of the master and answer page.

33 Claims, 15 Drawing Sheets

Figure 6
The Windows Calculator is a program that can be used for simple calculations.
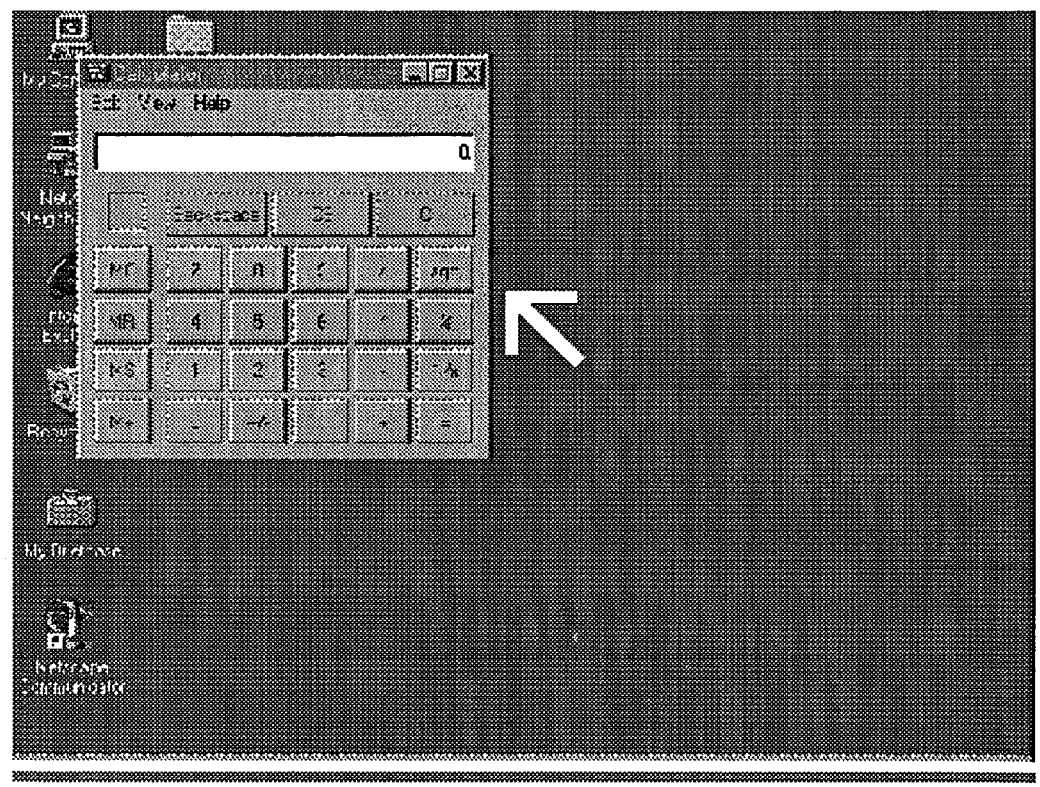
1 2 3 4
Text Author: Joe Orr   Copyright 2000 All Rights Reserved   Screenshot By: Joe Orr
Created with ScreenBook Maker   Additional Trademark and Copyright Information

Figure 12

```
01  <?xml version="1.0"?>
02  <screenbook>
03    <title>Simple Screenbook</title>
04    <category>Test</category>
05    <subcategory>Test Category</subcategory>
06    <format>Lab</format>
07    <pages>
08      
09        <text>
10          <span id="pagetext"><p>This is the Windows Desktop.</p>
11             <p>Doubleclicking on the Calculator icon
12                will cause the Calculator program to start.</p>
13          </span>
14        </text>
15        <picture width="640" height="480">pic 1.png</picture>
16        <title>Windows Desktop</title>
17        <author>Joe Orr</author>
18        <sauthor>Joe Orr</sauthor>
19        <cp>Copyright 2000 All Rights Reserved</cp>
20        <authoremail>orrj@jserv.com</authoremail>
21      
22      
23        <text>
24          <span id="pagetext">
25             <p>This is the Windows Calculator.</p>
26          </span>
27        </text>
28        <picture width="640" height="480">pic 2.png</picture>
29        <title>The Windows Calculator</title>
30        <author>Joe Orr</author>
31        <sauthor>Joe Orr</sauthor>
32        <cp>Copyright 2000 All Rights Reserved</cp>
33        <authoremail>orrj@jserv.com</authoremail>
34      
35    </pages>
36  </screenbook>
```

Figure 13

```
01  <?xml version="1.0"?>
02  <xsl:stylesheet xmlns:xsl="http://www.w3.org/TR/WD-xsl">
03  <xsl:template match="/">
04  <html>
05  <body>
06  <h2>
07    <xsl:value-of select="screenbook/category"/>
08    : <xsl:value-of select="screenbook/subcategory"/>
09    : <xsl:value-of select="screenbook/title"/>
10  </h2>
11  <xsl:for-each select="screenbook/pages/page">
12    <xsl:apply-templates select="text/*">
13      <xsl:template>
14        <xsl:copy>
15          <xsl:apply-templates select="@*|*|text()"/>
16        </xsl:copy>
17      </xsl:template>
18    </xsl:apply-templates>
19    <br/>
20    <img>
21      <xsl:attribute name="src">
22        <xsl:value-of select="picture"/>
23      </xsl:attribute>
24    </img>
25    <br/>
26    <small>
27      Author: <xsl:value-of select="author"/>
28      <xsl:value-of select="copyright"/>
29    </small>
30    <br/>
31    <hr/>
32    <br/>
33    <br/>
33  </xsl:for-each>
34  </body>
35  </html>
36  </xsl:template>
37  </xsl:stylesheet>
```

Figure 14

```
01  <html>
02  <body>
03  <h2>
04  Test : Test Category : Sample Screenbook
05  </h2>
06  <span id="pagetext">
07  <p>This is the Windows Desktop.
08  </p>
09  <p>Doubleclicking on the Calculator icon will cause the
Calculator program to start.
10  </p>
11  </span>
12  <br />
13  <img src="pic 1.png" width="640" height="480" />
14  <br />
15  <small>
16      Author: Joe Orr
17  </small>
18  <br />
19  <hr />
20  <br />
21  <br />
22  <span id="pagetext">
23  <p>This is the Windows Calculator.
24  </p>
25  </span>
26  <br />
27  <img src="pic 2.png" width="640" height="480" />
28  <br />
29  <small>
30      Author: Joe Orr
31  </small>
32  <br />
33  <hr />
33  <br />
34  <br />
35  </body>
36  </html>
```

SCREEN MAKER

TECHNICAL FIELD

The present invention relates to an instructional book and online program. More particularly, the present invention relates to a program for the creation of instructional books containing snapshots of computer screens.

BACKGROUND

Perhaps the biggest problem currently facing industry in the U.S. is providing computer training and testing. Computer programs are becoming essential to more and more businesses and people. Programs are constantly changing, at an ever increasing rate. For every new program or version of a program released, management must decide either to stay with the old program or adopt the new release. Staying with the old program involves the risk of using a solution that is less efficient, less powerful or simply less popular than that used by the competition. On the other hand, adopting a new program involves costs attendant to such a change, for example, training costs and disruption to business activity by time spent learning and adapting to the new program. Also, companies must train new employees to use the computer systems which the company has adopted. A significant cost of doing business is related to computer training.

Training is critical not just for companies and individuals seeking to learn how to use a given product. Software makers also often create training programs and certifications to ensure that there is an adequate supply of qualified personnel for a product. It is critical for these software makers to create training programs soon after the product is released, and to create examinations for the certifications that are an effective measure of mastery of the product.

A need exists for a type of computer training that is highly effective and yet inexpensive and quick to create. Moreover, a related need exists for a method of evaluating how well the student has actually learned the material covered in the training and whether the student can apply the training to an actual situation.

Various types of training and of learning materials now exist. The main modes of instruction now available are textbooks, lectures, videos, or computer based learning (or some combination thereof). Without going into an exhaustive analysis of all possible types of training and combinations of learning methods it may be simplest to focus on what factors make it easier for users to learn quickly in a situation where technological change is both rapid and urgent. The following are the main points to be considered by management or by individuals when choosing a training or learning method:

1. Is the material self-paced? If so, this means that classes do not have to be scheduled, and people who can learn quickly are not held up by those who cannot.
2. Can the learning take place at the student's choice of location? It is an advantage if the training can be done at the student's desk or office rather than requiring travel to a special location.
3. Is the material affordable, i.e., is it within available budget? Is there a more cost-effective training tool?
4. Is the material available? Obviously, even if it has been decided that video instruction is best, this will not be relevant if a video for the requested subject matter has not yet been created or is otherwise unavailable for use.
5. Is the material in a standard format? The more familiar the format is, the less time will be required for learning, and the more receptive students will be.
6. How effective is the material? A printed book might be cheap and usable as self based training, but a book might be less effective than a video, because a well made video can demonstrate a technique in a computer application rather than simply describing it.
7. Is the training interactive? Active participation is generally a more effective tool as the student must actually exercise the skills.
8. Is the training verifiable? Does the training provide testing which demonstrates that the student has mastered the subject?

When comparing textbook instruction, lectures, video instruction and computer based instruction, a number of comparative advantages and disadvantages with respect to the above points can be seen. Lecture based training has numerous disadvantages which are obvious from consulting the above list. Simple printed instructional matter is the cheapest to create and distribute. Students can consult a text at any time and no special equipment is needed for viewing. However, printed instructional matter by itself is generally not as effective as is a more interactive media.

Videos and some types of interactive computer tutorials have great advantages. (Examples of interactive computer tutorials are tutorials created with Macromedia Courseware or Director. Examples of videos are those made by Keystone Learning Corporation.) Much of current software consists of using a graphical user interface. A demonstration is far more effective than reading a description or attending a lecture. Videos have an advantage over computer-based tutorials in that they tend to be cheaper to create than interactive computer tutorials. Videos have a disadvantage in that they are not interactive. However, videos are much cheaper to create than interactive computer tutorials. Videos and most interactive tutorials have a significant disadvantage when compared to a book: videos and computer tutorials do not have random access (you can flip a book open to any page, but you cannot easily jump directly to any spot in a video or in an interactive computer tutorial that resembles a video).

Fairly recently publishers have come up with a format that combines all the advantages of a book with most of the advantages of a video or interactive tutorial, and thus has unique advantages when considered with respect to the points enumerated above. This format consists of small amounts of text with snapshots of a computer screen (screenshots). Tasks are described step by step. Each step has a corresponding picture.

Some examples of this format are:

Easy Microsoft Windows 2000 Professional (Que Easy Series) 2000 Shelly O'Hara ISBN 0789721872

Directory 7 For MacIntosh and Windows (Peachpit Visual Quickstart Series) Andre Persidsky ISBN 0201353989

Master Office 2000 Visually (IDG 3-D Visually Series) Ruth Maran et al ISBN 0764560506

For the purpose of this explanation, we will call such books (books in which computer tasks are visually described through actual screenshots) "visual tutorials".

Printed visual tutorials still have some disadvantages. They are expensive for organizations or individuals to create. They are usually not in electronic form, so they are not electronically searchable and cannot be easily shared.

Currently, it is possible for users to manually create a kind of HTML (hypertext markup language) visual tutorial using tools such as Microsoft Front Page. However, inserting a screenshot into a web page requires first using the PrtScrn key to copy the screen to the clipboard, using a graphics program to take the screenshot from the clipboard and transfer it to a PNG (portable network graphics) file, and then using FrontPage to insert the screenshot into a single webpage. The page numbers and links must be created manually, depending on the web page creation software being used. The user must manually change the screen resolution if so desired. This visual tutorial creation method is laborious and does not result in a standard layout and design, since each user has to decide how to create the links from one page to another, where to put the text, how to distribute the book, and so on. Further, most users do not know how to manually create a visual tutorial as described, and they also may not have the required graphics and HTML creation software installed on their machines. The present invention not only makes all steps in the process of creating a visual tutorial automatic, it also allows users to create formats for the books separately, and then create from these formats multiple versions of a page from a single master page. Further, this page can be created in any industry standard format, including RTF and PDF, not just HTML.

In addition to tutorials, there has been a need for an effective test method for truly evaluating whether a person has mastered a subject such as networking or systems analysis. Further, certain companies conduct certification testing which is to test whether the student possesses the basic ability to perform certain jobs. This testing has generally been conducted on a multiple choice format. Such a format does not necessarily establish that the student can perform the required actual work. Also, since there are a limited number of questions and there are sources which collect and distribute the questions, students are able to study for the test without comprehending the subject. Thus, there has been a need for a method to test students which more closely appropriates the actual situation and requires the student to actually manipulate the programs for which certification is sought.

There is a need to provide a tool for creating and distributing visual tutorials that makes it easy for even the average user to create and distribute such tutorials, and allows such tutorials to be created in either electronic or printed form, and in multiple designs and formats. This is what the present invention does. The present invention also extends the visual tutorial format to take advantage of all of the possibilities inherent in an electronic, online media as opposed to the printed media, and in an interactive media (a computer program) as opposed to a static media (a printed page). One such extension is to allow the visual tutorials to be used as interactive test. That is, the present invention creates a visual tutorial which is more than just a visual tutorial in electronic form. Thus, the present invention is one which allows users both to easily create visual tutorials (thus having advantages over existing means of creating such tutorials) and is also one which extends the possibilities of the visual tutorial format.

SUMMARY OF INVENTION

The present invention contains features, such as automatic (direct) screen capture, that allow users to easily create online and printed visual tutorials. In fact, the software of the present invention makes the creation of these visual tutorials so easy that even the average user can quickly make an effective tutorial in their area of expertise. The present invention automates the creation of pages in HTML, PDF (portable document format), RTF (rich text format) and any number of electronic formats, and the pages can be printed from the program or from any standard program for viewing such formats.

The present invention also provides the advantage of a program that makes it easy to publish, share, and work collaboratively on visual tutorials or any other kind of electronic book created by the software. Users can use the software to create online books and visual tutorials in a standard design, and can make their own page designs using XSL templates. The software communicates with a website and can upload and download books from the default website or any other website. The design of the online books created by the software allows users to share books or even single pages, with all authoring, copyright, or any other desired information retained by each page.

In yet another aspect of the present invention extends the visual tutorial format to allow visual tutorials to be used interactively, not just as static reading material. This makes the visual tutorial become a means of evaluation, and not just a means of learning/training. The present invention allows for a testing format which better tests the abilities of the student. Further, the present invention allows for a number of different testing formats depending on the purpose of the testing. For example, it allows for easy self grading by the student, or for grading by a third party which may be done on the student's site or remotely.

The present invention provides a computer program which accepts text input and an image input and directly creates a page in a common internet language such as HTML or XML. "Common internet language" as used herein means a computer programming language that is a standard or common programming language designed to facilitate communication between the different types of computers and operating systems found on the internet and specifically includes all versions of HTML, XML (extensible markup language) and PDF (portable document format). The present invention also preferably includes program code to store a series of created pages with assigned page numbers and which allows a user to recall the pages in any desired order. Thus, unlike a video, the present invention provides a visual tutorial having many pages which can be displayed nonlinearly so that the user may go directly to the page of interest.

In another aspect, the present invention provides a computer program useful as a testing vehicle. An instructor creates one or more master pages as described above, each of which has a textual instruction and an image illustrating what a computer screen looks like when the instruction is correctly performed. The program saves these master pages and the program allows a student to display just the textual instruction. The student then attempts to perform the instruction and inputs his or her response as an image to create an answer page. The program code then allows the master page(s) created by the instructor to be displayed so that the master page(s) can be compared with the student's answer page(s).

In yet another aspect, the invention relates to a system for the remote access of a database and allows new books or new pages to be downloaded to the database, or the uploading of books or select pages of books from the data base. The user accesses the database and can deposit a book or can download an existing book or individual pages from existing books. Thus, the invention relates to providing a system to increase the access and distribution of the books. In a preferred embodiment, access can be controlled to limit the user's access as desired. Further, the on-line system allows for remote testing. A student can access the database and download a test book having just the text portion displayed. The student then completes the pages and submits his answers pages. The test can be graded either by an instructor who accesses the student answers and compares them with the master book, or the student can self grade his/her test by accessing the master and comparing the master with his/her answers.

BRIEF DESCRIPTION OF THE DRAWINGS

The invention will be understood with reference to the detailed description in conjunction with the drawings;

FIG. 6 shows FIG. 5 with the input screen hidden.

FIG. 12 is an illustration of pages created by the present invention.

FIG. 13 is an illustration of an XSL file used in the present invention.

FIG. 14 illustrates HTML output.

DETAILED DESCRIPTION OF THE PREFERRED EMBODIMENT

In its simplest application, the present invention automates the creation of a page containing screenshots. First, the process of creating a single page with a screenshot will be described. Creating a series of pages to form a book will be discussed later. Like numbers in the various Figures refer to like items.

Figure 1:
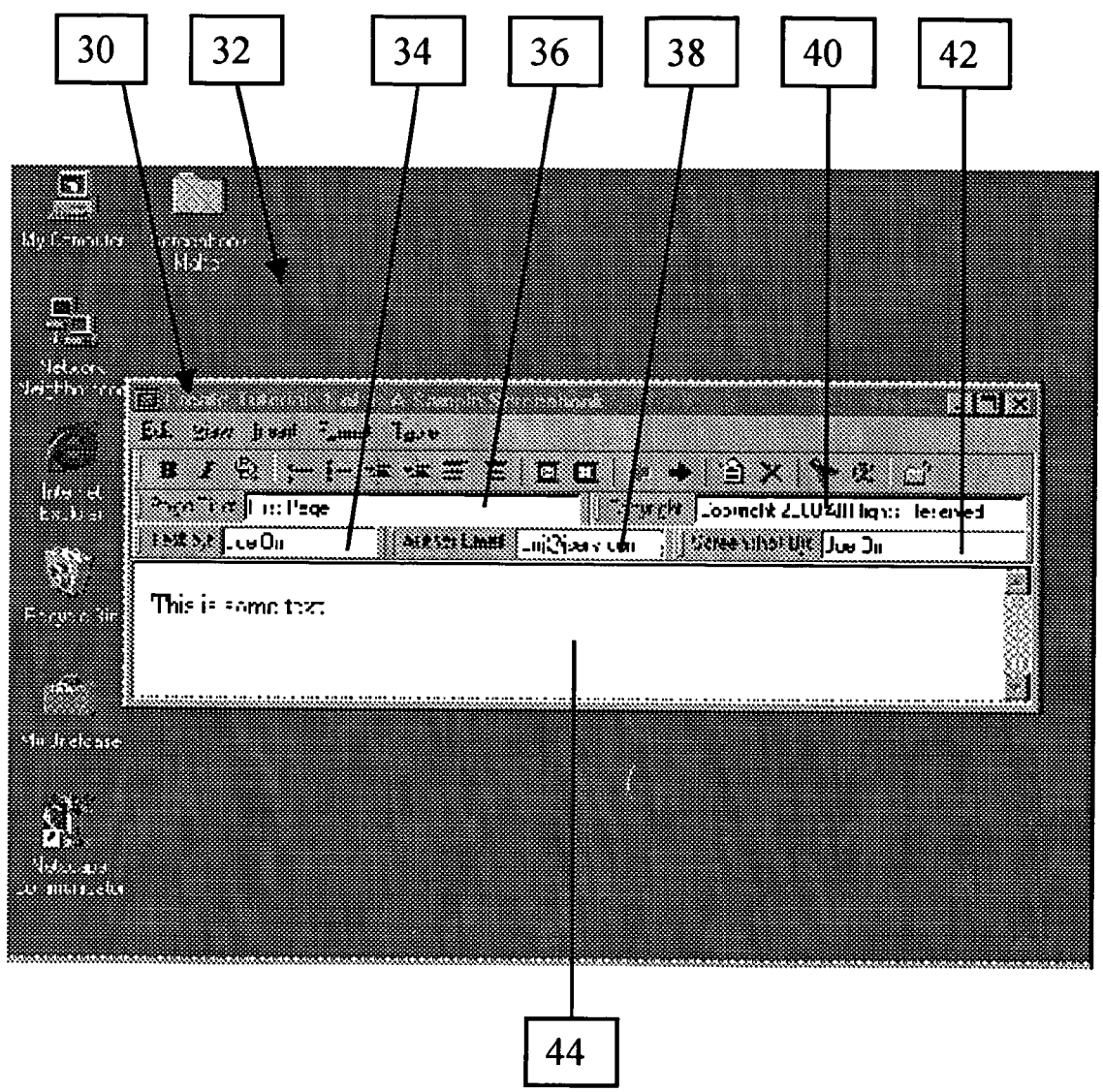
FIG. 1 is a view of an input screen of the present invention.

The program is started, and generates an input display which prompts the user to input informational text. This text will be a description or explanation of the screenshot along with any other desired information such as author, page name, copyright information, and so forth. The input screen of the preferred embodiment is illustrated in FIG. 1. The input screen 30 is preferably a floating screen which remains on top of other applications. For example, a portion of a Window's desktop (32) can be seen in the background of the illustration. Input screen 30 may be any desired size and can have the typical windows controls allowing it to be resized or closed. In the embodiment shown, the input screen displays prompts for the user to input the predetermined information. The screen has a prompt 34 for the input of the name of the page author, prompt 36 for input of the web book title, prompt 38 for the author email, prompt 40 for input of copyright information, prompt 42 for input of the figure author or source, and a section 44 for input of text.

Figure 2:
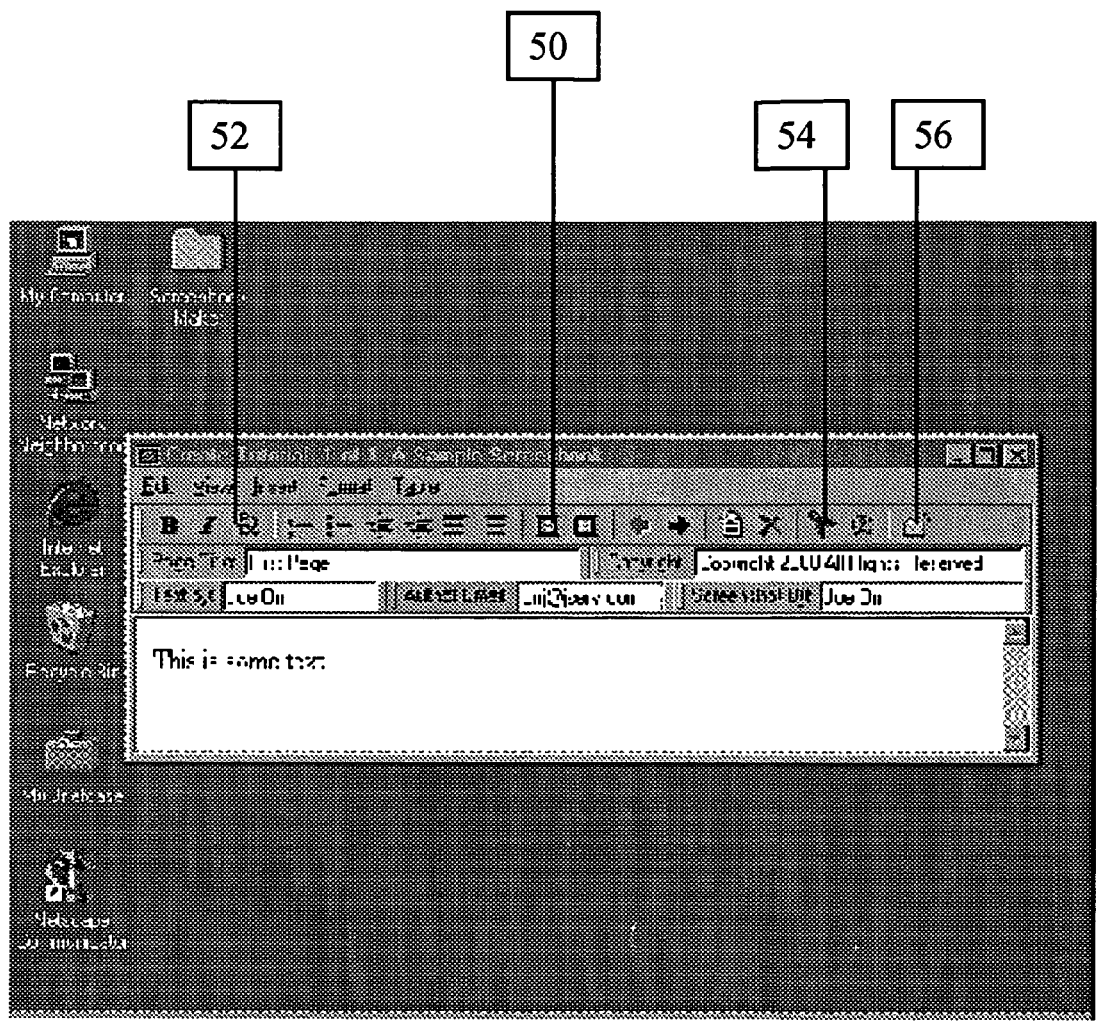
FIG. 2 is a view of an input screen of the present invention.

The input screen also preferably includes control buttons for initiating various functions of the program. FIG. 2 again shows the form displayed in FIG. 1, but with a tool bar with various control buttons indicated. Screen capture button 50 is pressed when the user has completed the input screen to his or her liking and would like the program to capture the screen and insert this screen picture into a page. Other controls useful for the creation of screen snapshots and text formatting may be present. For example, FIG. 2 shows other buttons such as an indicia control button 54 for a floating arrow or other type of indicia for indicating points of interest on the screen, and a control button 52 for changing the font color of the description text inputted into the description input box. Controls do not have to be in the form of buttons but can be of any desired type, such as a menu. Also, as is well known in Windows applications controls may be provided in multiple forms such as drop down menus, mouse pop up menus, tool bar buttons, keystroke combinations, etc. For clarity and brevity the invention will be described only in reference to button controls.

Figure 3:
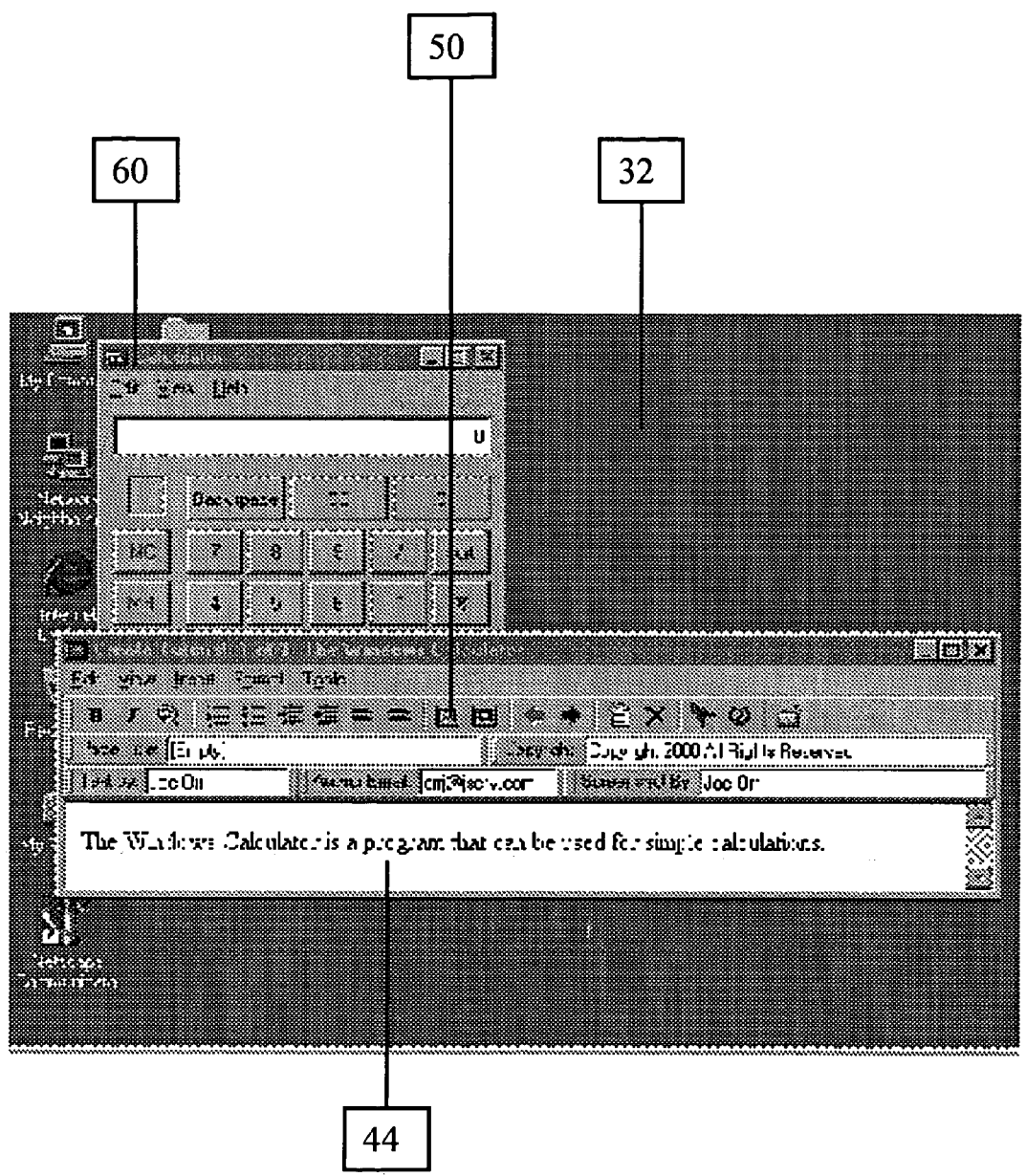
FIG. 3 is a view of a computer screen with the calculation in the background and input screen floating.

FIG. 3 shows a sample page with the inputs before the user activates the command to cause the program to make a completed page from the inputted text and a snapshot of the screen (minus the input form). In this case, the user has entered the text "The Windows Calculator is a program that can be used for simple calculations" in the input text box 44. The user has also arranged the screen (with the exception of the input form, which is automatically hidden when screen capture occurs) so that the screen illustrates the text. The screen has been arranged so that the Windows Calculator program (60) appears by itself with a backdrop of the Windows Desktop (32). (This example applies to the Microsoft Windows operating system, but the explanation is similar for any modern graphical operating system.)

Figure 4:
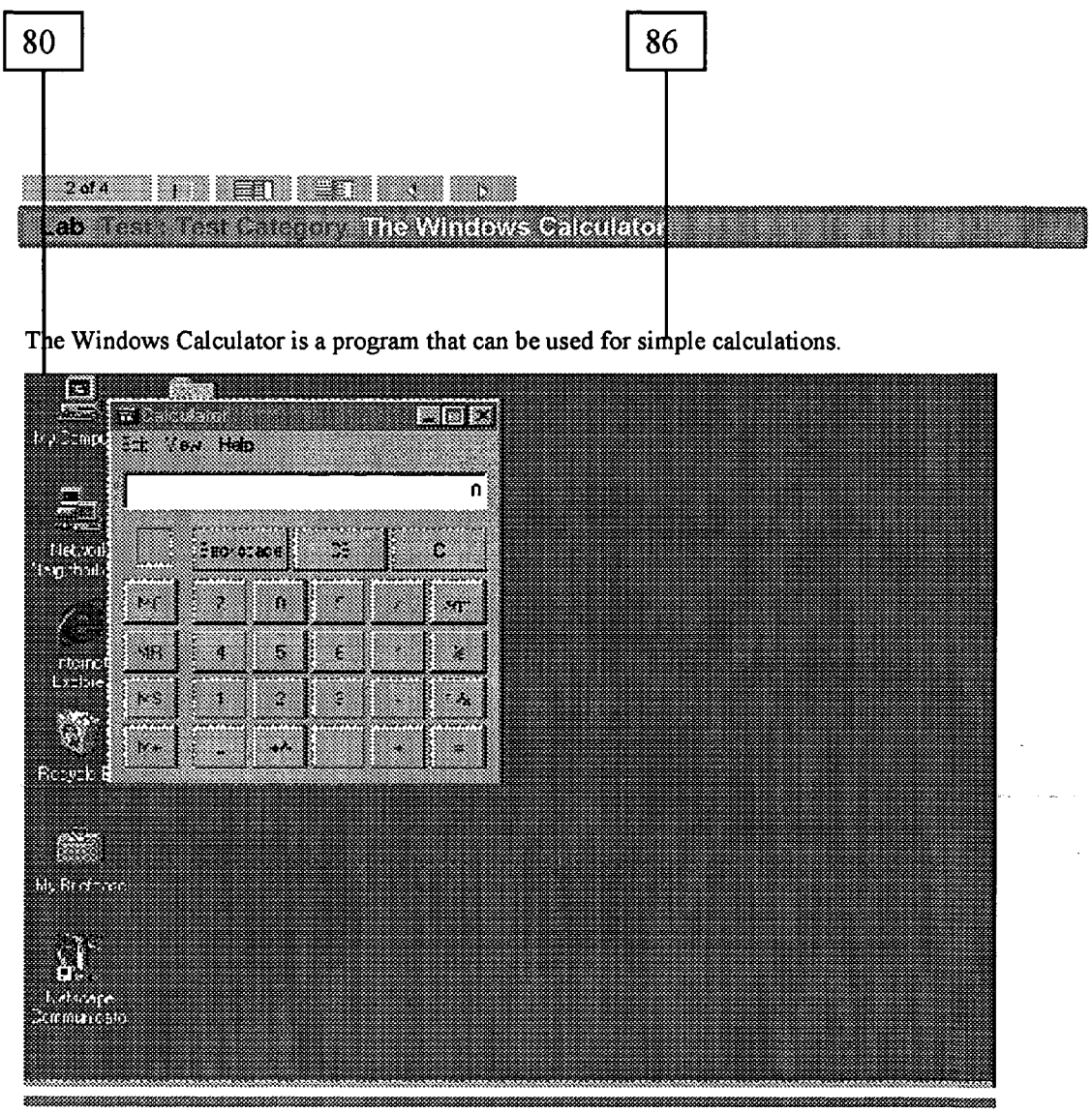
FIG. 4 is a view of a computer screen with the input text screen hidden.

After the user presses the page creation button 50, the program code automatically captures the screen, converts the captured image to a PNG or other image file (such as JPEG (joint photographic experts group)) and combines this image (80) with the text information (the description 86, copyright 84, author name 82, etc.) into a finished page. This finished page can be in any number of formats such as XML, PDF, or HTML and can be viewed or printed from the program or from external programs. FIG. 4 shows an HTML page created from the input screen shown in FIG. 3. The program has created an image of the screen, taken the inputted text, and created an HTML page. The HTML page can be viewed directly from the program or from any browser, or can be printed.

Figure 5:
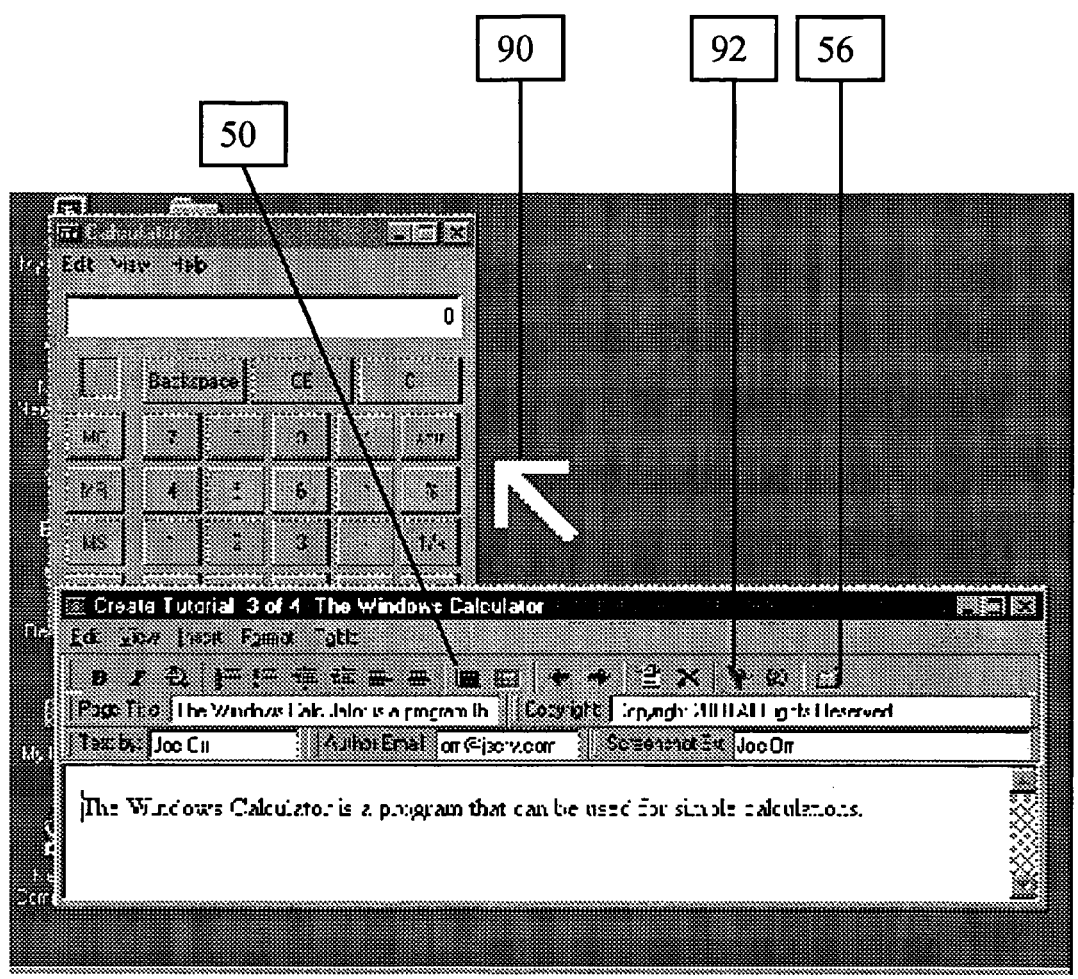
FIG. 5 illustrates the floating arrow function of the present invention.

FIG. 5 shows the same input form as FIG. 3 and contains indicia control button 92. FIG. 5 is an illustration of the screen display after the user has pushed indicia control button 92 to cause a floating arrow 90 to be displayed. This arrow 90 can be moved by the user to the proper position to indicate a point of interest on the screen. When the program captures the screen, this arrow will also be captured in the screen image. Obviously, indicia other than an arrow can be employed.

FIG. 6 shows the page created by the user pressing the screen capture button 50 when the input form is as displayed in FIG. 5.

Figure 7:
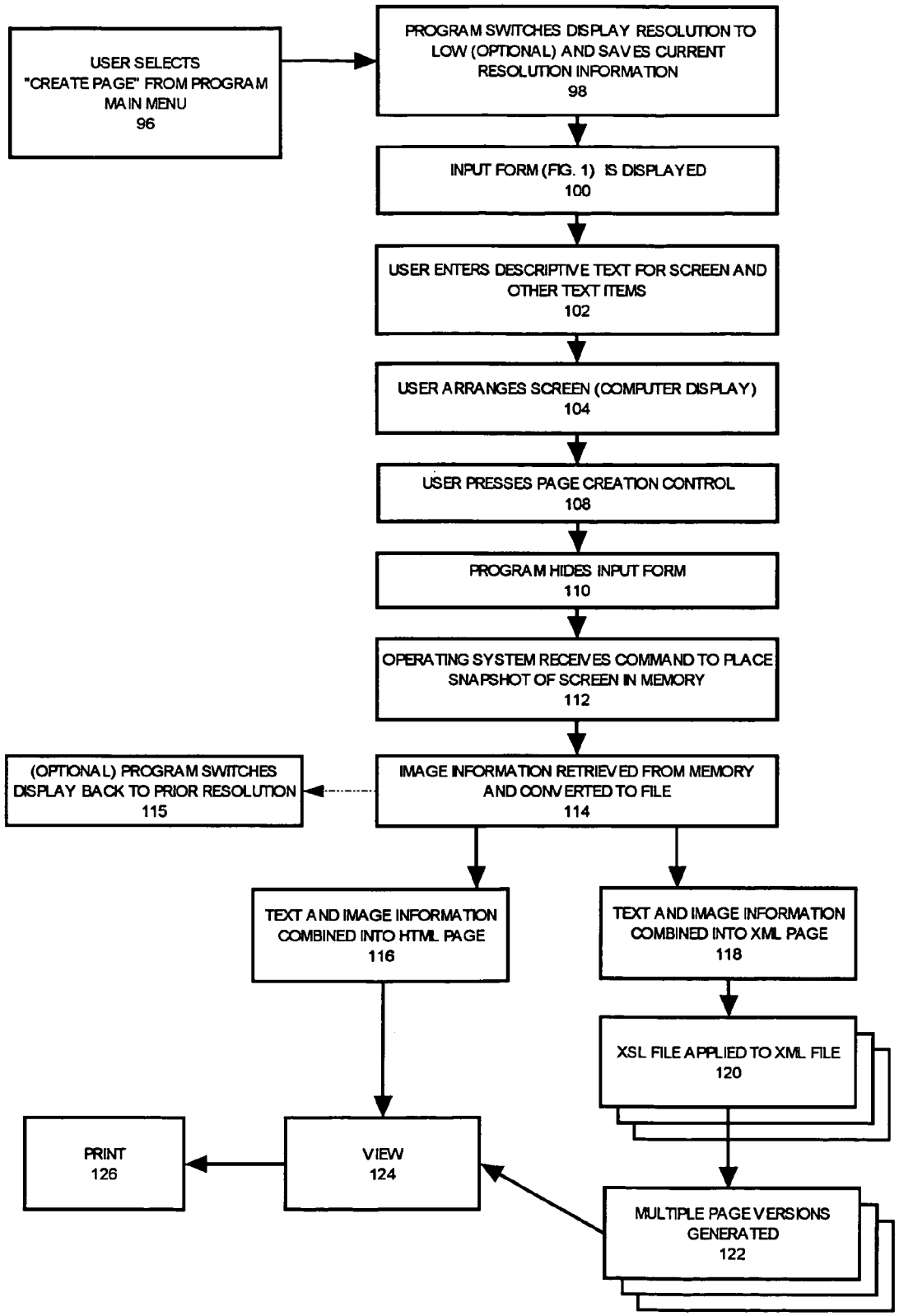
FIG. 7 is a schematic diagram of one embodiment.

FIG. 7 is a flow chart of the program code. The user of the program initiates the page creation process by making a selection (96) from a menu or other control in the programs' main interface. First, this can optionally cause the program to set the computer display into low resolution. Setting the computer to low resolution results in screen snapshots with a considerably smaller file size than those of higher resolutions. If the program is configured to change the screen resolution it will also save the current resolution before changing so that the current screen resolution can be restored when the user is finished creating pages. Next, the program displays an input form box 100. The input form, as previously described, has inputs for a description of a screenshot and other inputs for author and copyright, etc. The user inputs the proper descriptive text for the page and also inputs any other text items as desired box 102. The user then arranges the screen as desired to match the descriptive text box 104. For example, if the descriptive text entered by the user is "Open the Windows Calculator", then the user would close all other programs and open the Windows Calculator. When the program user is satisfied that the screen is properly set up for a snapshot, the user presses a button or other control to signal to the program to create the page in box 108. The program then hides the input form in order to prepare the screen for taking a snapshot in box 110. Next, the program causes a snapshot to be taken by signaling to the operating system to place an image of the screen into memory in box 112. This step depends on the operating system and could be different on different platforms). After the image information has been placed in memory, the program retrieves this information and converts it to a file. In the preferred embodiment, this file is a file in the PNG format in box 114. Which is accomplished by a standard image file format component such as TiffKit (made by Informatiks, Inc.) on the Windows platform or ImageMagick on the Linux platform. The program can at this point restore the screen resolution to its original setting if this resolution has been changed in step box 98. The program is now ready to create a page. The program can combine the text information retrieved with information about the file to directly create an HTML file in box 116. In a similar fashion, the program can create an XML page which can then be used to create other pages from the same text and file information. In the preferred embodiment, these additional pages are created by applying transformation instructions in the form of XSL (extensible stylesheet language) files in box 120. Multiple XSL files can be applied sequentially to one XML file, resulting in multiple HTML files with different formatting (for example, different colors and fonts) and/or in multiple output formats, such as PDF, RTF or TIFF (tag image file format) files. The XSL is applied to the XML via such third-party XSL processors as Microsoft's MSXML.DLL or the Saxon XSL processor.

At this point in the process, one page or multiple pages have been created. Since these pages are all standard formats such as HTML, PDF or TIFF, they can easily be viewed and printed from standard external programs. However, the preferred embodiment contains an integrated HTML viewer with plug-ins to this viewer available for PDF, TIFF and other files. The page can be printed from this viewer. Additional pages with new text and image can be created by repeating these steps. Previously created pages can be rewritten with new XSL stylesheets, or new version of existing books can be created by the addition at a later time of more XSL files to the collection of XSL files maintained by the program.

Besides the creation, viewing, and printing of pages containing screenshots, the program has a second function which allows a page of the type described above to be used interactively as a test or tutorial item. In this case, a master page will have been created with text prompting the user to perform some task, such as "Open the Windows Calculator" and a screenshot illustrating this task in the manner described above. In this test mode, a form is generated by the program code that allows the user to select a page. After the user selects a page the program then displays a form containing only the descriptive text contained in the master page without displaying the screenshot associated with the page. (The program can also be configured to hide the screenshot and not the text, but in the preferred embodiment, the default is to hide the screenshot.) The text is displayed, for example "Open the calculator".

Figure 8:
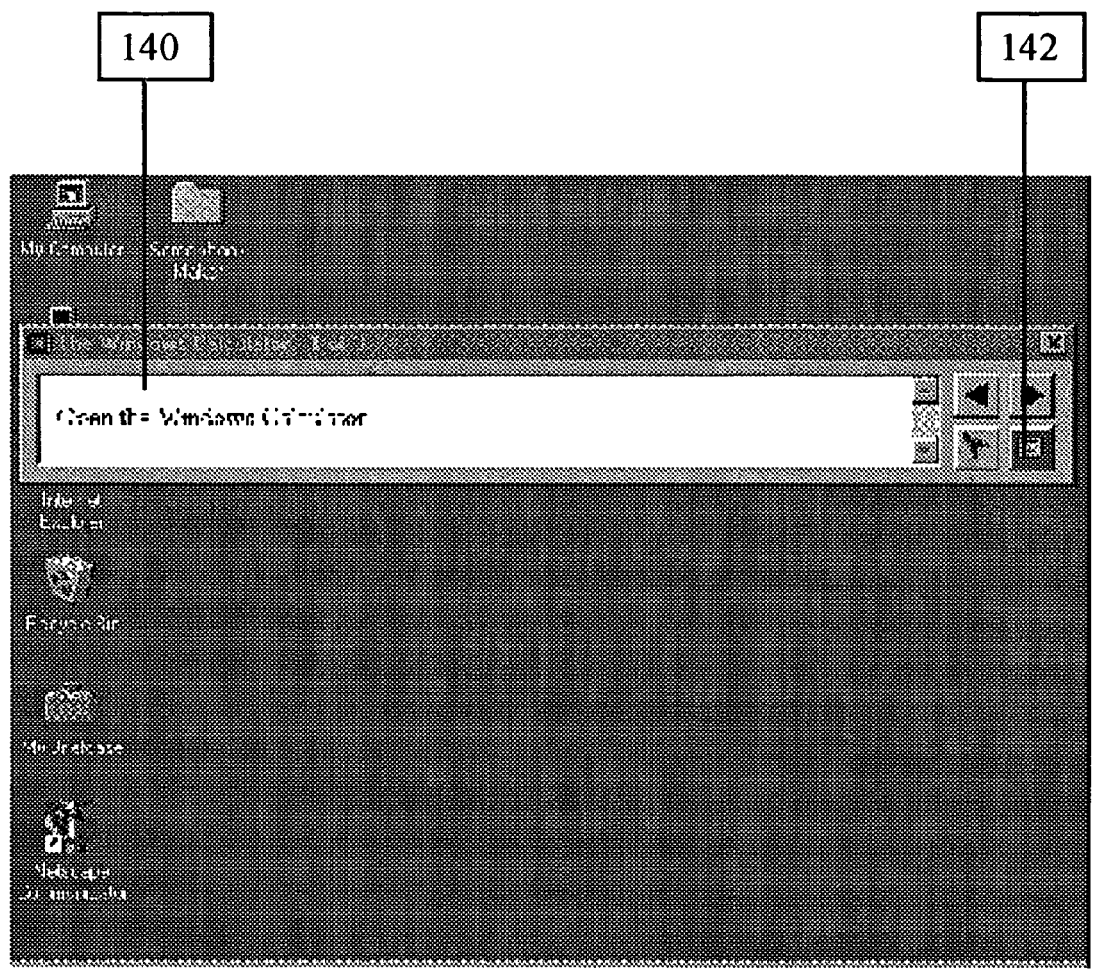
FIG. 8 is a view of a partial display of a created page.
Figure 9:
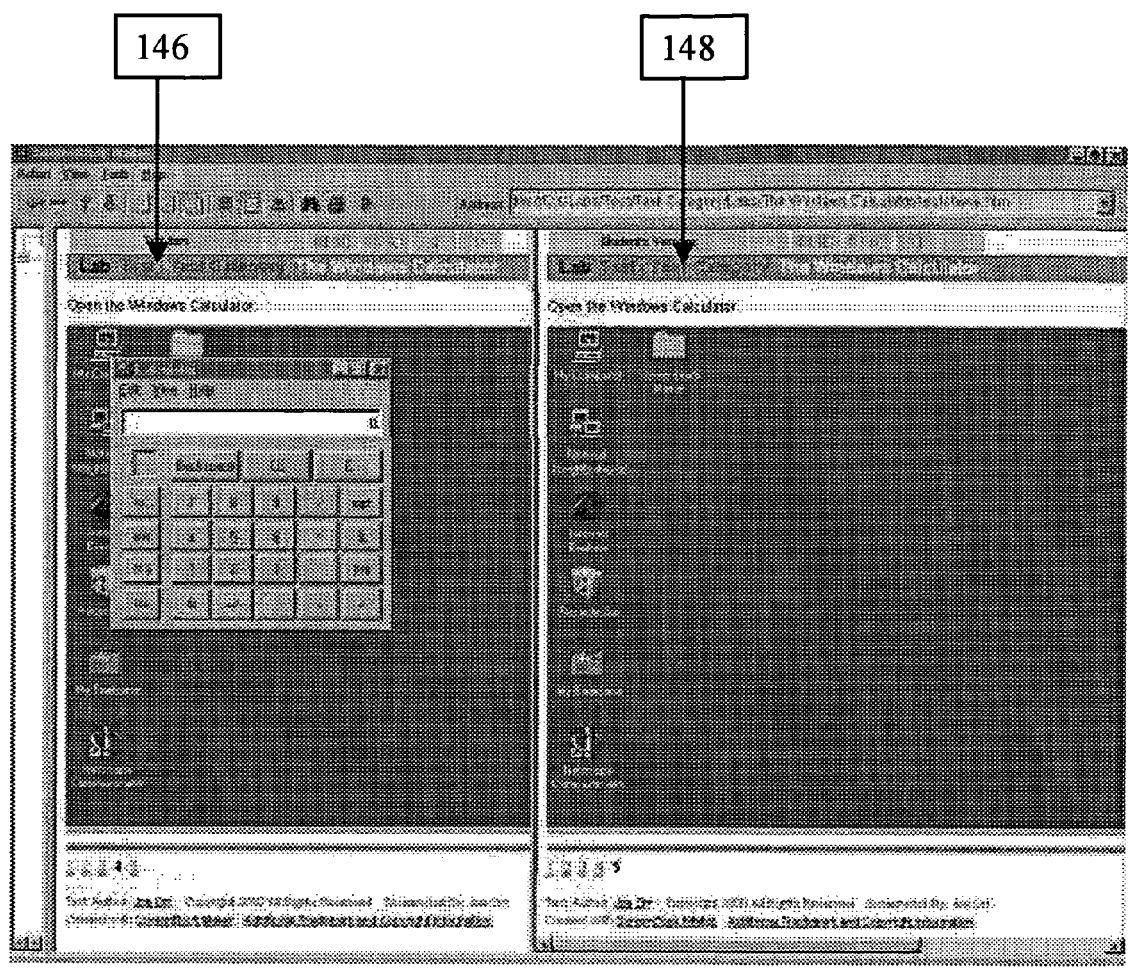
FIG. 9 is a screen illustrating the comparative feature of the present invention.

FIG. 8 shows an image of a computer screen with a sample form containing descriptive text 140. The user then tries to perform the requested task. When the user believes the screen has been properly arranged to match the text, the user presses the page creation button 142, in similar fashion to the page creation step for creating an original page described above. This causes a second page to be created (the student's version). The program then closes the input window and displays both the original page and the second page side by side. The student or an examiner can compare the correct screenshot with the student's screenshot. FIG. 9 shows an image of a screen where the original page 146 is being presented by the program in the right pane of the window, and the student's (incorrect) version is being presented in the right pane 148

A second variation on this process is possible with the program. This is the case where the text of a test item has been created, but no screenshot has been taken. In this case, creation of the student's page proceeds as above, but when the final page is created it is simply displayed, and the student or examiner can check the screenshot of the page against the text of the page rather than against a preexisting screenshot.

Figure 10:
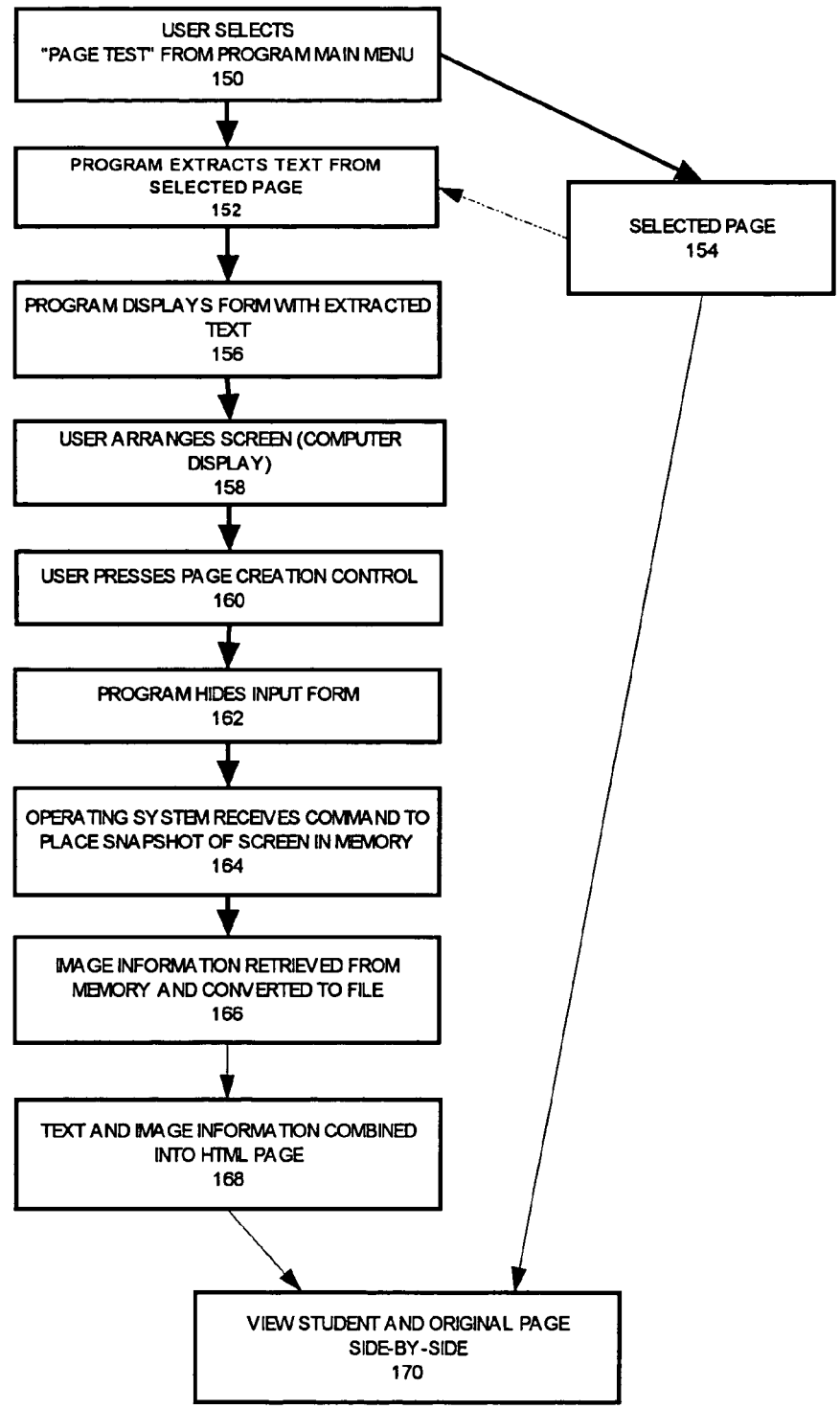
FIG. 10 is a schematic diagram of another embodiment of the invention.

FIG. 10 is a flow chart of the program code for this interactive mode of the program. The process for testing from a page is initiated by the user choosing a test item from a menu. This causes the program to extract the descriptive text from the selected master page box 152. The program then creates a form with this extracted text and displays the form on the screen box 156. In response to this, the user arranges the screen to match the displayed text. For example, the text may be "Open the Window Calculator" and the student would close other programs and open the Windows Calculator program. When the user believes the screen has been properly arranged to match the text, the user presses the page creation button box 158. In response to the user's action, the program then hides the input form in order to prepare the screen for taking a snapshot in box 162. Next, the program causes a snapshot to be taken by signaling to the operating system to place an image of the screen into memory in box 164 (this step depends on the operating system and could be different on different platforms). After the image information has been placed in memory, the program retrieves this information and converts it to a file. In the preferred embodiment, this file is a file in the PNG format in box 166 which can be accomplished by a standard image file format component such as TiffKit (made by Informatiks, Inc.) on the Windows platform or ImageMagick on the Linux platform. The program is now ready to create the student's answer page. The program combines the text information retrieved with information about the file to directly create an HTML file box 168 or other viewable file which is the student's answer page. The newly created HTML file, the students answer page, and the original file, master page, box 154 are now presented side by side. In the preferred embodiment, the master page and the student page are displayed side by side; however, the invention also includes other methods of comparing the results such as toggling between the master and the student's answer pages, or the printing of the pages.

The operation of the program with respect to creating and interacting with single pages has now been described. Next, the operation of the program when creating books, that is, sets of pages, will be described.

The creation of books (sets of pages) is similar to the creation of individual pages, except that when the user presses the page creation button the program does not immediately create a page, but rather creates just the image file, and saves all of the text inputs in memory. When the user presses the finish button (FIG. 5, Item 56), the program then either create a series of linked HTML files (one for each page) or a single HTML file (with all text and pictures included) and/or writes all of the text items and image information to an XML file. This XML file can then be processed further via XSL files to produce multiple versions in any number of industry-standard formats.

Figure 11:
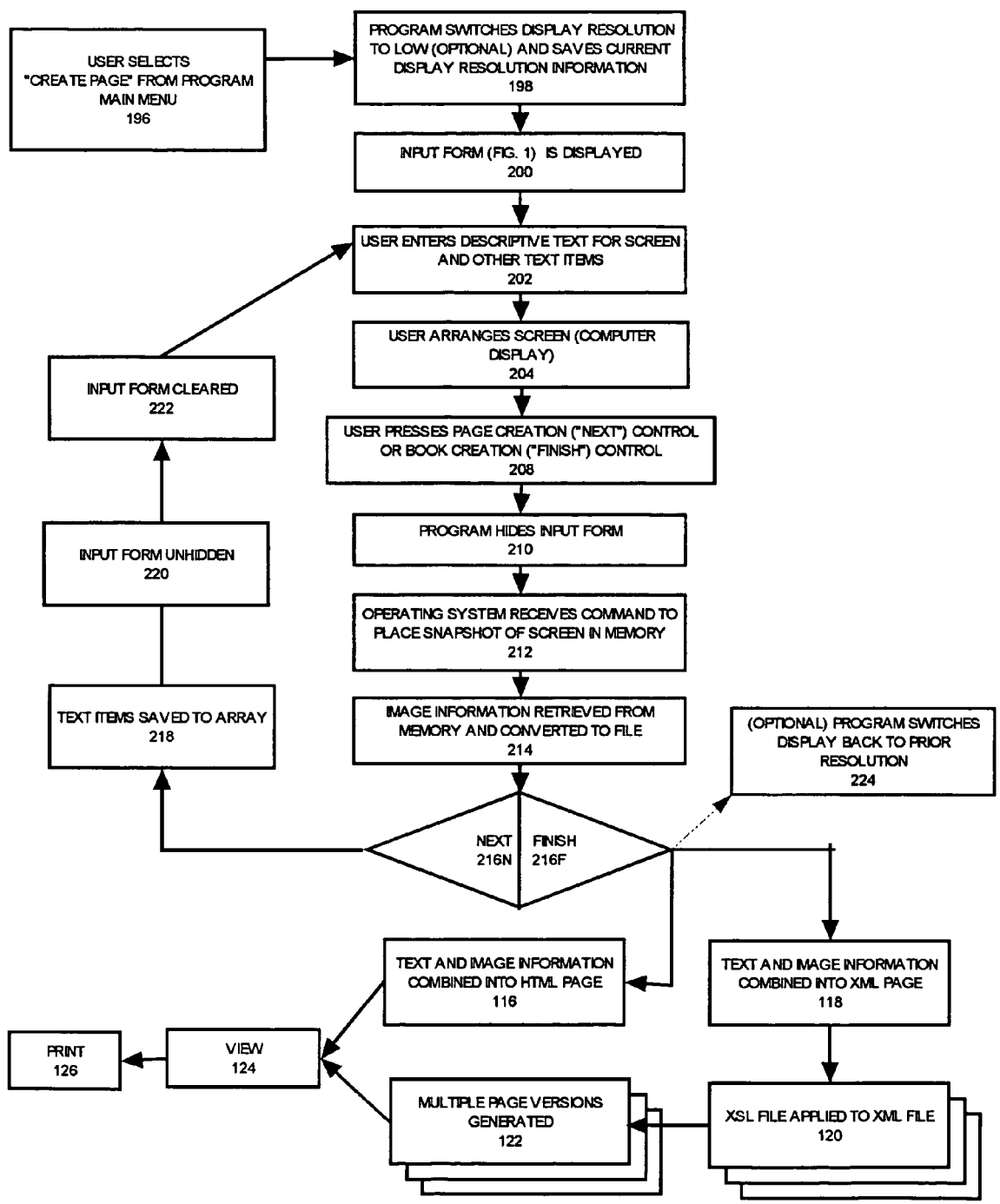
FIG. 11 is a schematic diagram of yet another embodiment of the invention.

FIG. 11 is a flowchart of the program code for the multipage (book) creation process. The user of the program initiates the process by making a selection in box 196 from a menu or other control in the programs main interface. This can first optionally cause the program to set the computer display into low resolution in box 198. Setting the computer to low resolution results in screen snapshots with a considerably smaller file size than those of higher resolutions. If the program is configured to change the screen resolution it will also save the current resolution before changing so that the current screen resolution can be restored when the user is finished creating pages. Next, the program displays an input form in box 200. The input form, as previously described, has inputs for a description of a screenshot and other inputs for author and copyright, etc. The user inputs the proper descriptive text for the page and also inputs any other text items as desired in box 202. The user then arranges the screen as desired to match the descriptive text 204. For example, if the descriptive text entered by the user is "Open the Windows Calculator", then the user would close all other programs and open the Windows Calculator. When the program user is satisfied that the screen is properly set up for a snapshot, the user presses a button or other control. In the case of book creation, the user selects one of two controls here: either the "next" button (FIG. 2 item 50) or the "finish" button (FIG. 2 item 56). The program then hides the input form in order to prepare the screen for taking a snapshot in box 210. Next, the program causes a snapshot to be taken by signaling to the operating system to place an image of the screen into memory in box. 212 (this step depends on the operating system and could be different on different platforms). After the image information has been placed in memory, the program retrieves this information and converts it to a file. In the preferred embodiment, this file is a file in the PNG format in box 214 which can be accomplished by a standard image file format component such as TiffKit (made by Informatiks, Inc.) on the Windows platform or ImageMagick on the Linux platform.

The next step in box 216 depends on whether the user selected the "next" button or the "finish" button in step box 208. If the user selected "next", then the program branches through box 216N. It first saves all of the text items into an array box 218, reveals the input form in box 220, clears the input text boxes, and the user repeats the process of creating a page. If, on the other hand, the user chose "finish" in step box 208, then the program branches through box 216F. The remaining steps in boxes 116–126 are the same as previously described for individual page creation, except that multiple pages are created from the saved text items, rather than a single page created. By "page" we mean one screenshot with its associated text inputs. All such pages may in fact be converted to a single HTML file, or each page may be converted to a single file. Or, both cases could occur. An XSL file box 120 can create either a single HTML file containing all pages, or multiple files. The XSL files can also create PDF, RTF, and other file formats and page designs.

In order to clarify the concept of a "page" as understood by the program, a simplified XML version of a single set of pages is shown in FIG. 12. This book contains two pages. Each page is enclosed in an XML tag named "". The first page starts on line 8 and ends on line 21. Enclosed within the  tags are the page text (lines 9–14), the picture information (line 15), the page title (16) and so forth. Information pertaining to the book as a whole is contained in lines 3–6. This XML file is then processed with one or more XSL files, using any number of third party XSL processors. A very simple sample XSL file is shown in FIG. 13. The result of applying the XSL file shown in FIG. 13 to the XML file shown in FIG. 12 is HTML, and this HTML output is shown in FIG. 14. This HTML can be viewed via any browser, or through the software of the present invention. This particular sample XSL has generated a single HTML file with all pages in that file. However, another XSL file could easily be written that would write a separate HTML file for each .

Now that the creation of sets of pages has been described, it can be seen that creating sets of test items (as described above and shown in FIG. 10) is straightforward. The process is the same as for FIG. 10, except, as described above (steps 196–230), multiple pages are created by the students. At the end of the process, rather than viewing a single page and comparing this with a preexisting page as in step 170, the user will compare multiple pages side by side. This allows a book of items to be used as a test.

One or more of the following advantages can be appreciated in the visual tutorials created by the present invention.:

The tutorials are created in electronic form

Each item ("page", that is, one section of text with optionally an associated screen snapshot) is a single XML element.

Each item can have associated identifying information as for example, author name and copyright.

All page set information can be stored in one standard XML file.

The XML file can be used to generate multiple versions of HTML or other formats.

These advantages allow the present invention to be easily extended to network applications and included in a web site or other remote location where users can collaboratively create visual tutorials with the program. Because all information is in standard XML files that can be sent and retrieved via HTTP to a web site or other remote location, and because each page has identifying information, users can publish visual tutorials, retrieve visual tutorials, and trade and edit individual pages created with the present invention.

Many possible methods for using the present invention for publishing and collaboration will be obvious to those skilled in the art. Several features of the present invention that allow the creation of visual tutorials to be extended to a network location will now be described, but this is not intended to limit the invention to just these network applications, since many possible network applications are inherent in the above described design.

The present invention, as previously mentioned, contains an HTML viewer (a browser) that can view HTML visual tutorials on a remote site. It also contains an FTP (file transfer protocol) client for sending and receiving visual tutorials in HTML format or any other format. The software of the preferred embodiment is configured by default to connect to a particular site, but the user may change this setting to point the client to any other site.

In a preferred embodiment of the present invention, the default website contains a membership database with different levels and areas of membership. For example, one area could be open to the general public and users would be allowed to join simply by choosing a user name and password. A higher level in the same area would, for example, require payment of a fee and additional verification. Another area of the website could be reserved for use by users from a particular group or institution. The access to pages and use of pages can also be restricted based on the copyright use information provided. For example, access could be restricted to a particular group or conditioned upon payment of a fee.

Since the client software (the software used for creating screenbooks and for connecting with a website) of the present invention contains FTP client capability, users can connect to the remote site and upload and download screenbooks using the program. The program can take care of logging the user into the website (presenting username and password, or using some alternative method, such as the presentation of a digital certificate).

Using the client software, the users can then, in addition to simply viewing screenbooks, also edit or interactively use books either by downloading them or directly accessing them on the website. For example, during the page creation and editing phase described above, the pages could be saved directly to the remote site rather than to the user's hard disk. Alternatively, users can "check out" (mark as temporarily locked) pages to their hard disk, edit them, and then send them back to the website. As another example, in the above case of interactive use, instead of interacting with a screenbook on the local hard disk of the user, the user could interact with a screenbook on the website. When the user is done creating the user version of the screenbook, the result is then compared with the authoritative original master version on the website. This comparison could be done by the user, by an expert at the remote website, or the user's version could simply be posted to the remote website and other users could compare the user's version with the master version.

Figure 15:
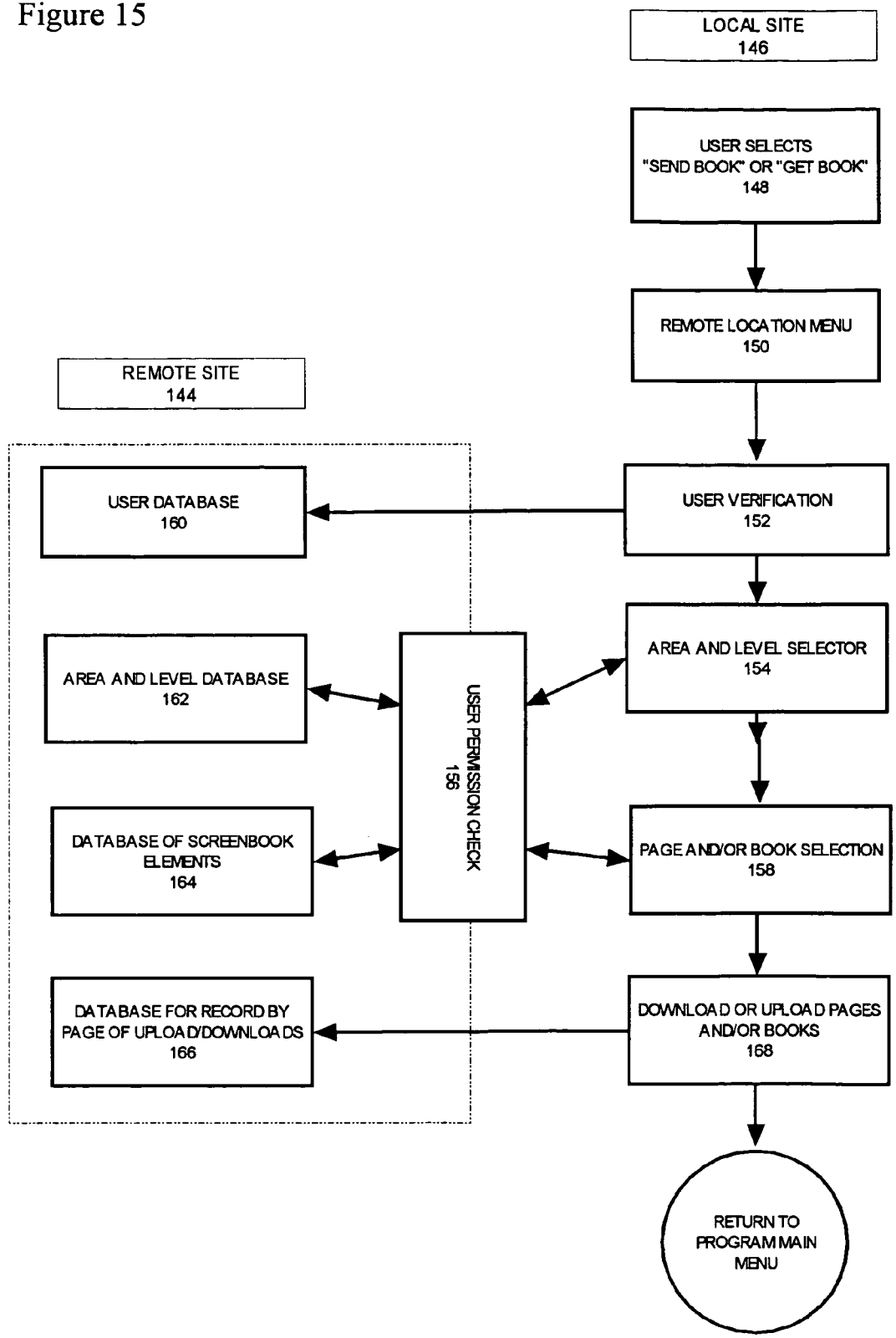
FIG. 15 is a schematic drawing of yet another embodiment of the present invention.

Since many network variations are inherent in the design of the invention, one example configuration will be discussed involving uploading and downloading books and/or individual pages from a website with a user database will be described. Many computer systems can be used in the invention. Referring to FIG. 15, in the network environment such as the internet, a local site box 146 could be a home personal computer, and the remote site box 144 could be a web server. Access to the remote site would be through an internet service provider or by direct access.

As illustrated in FIG. 15, the user selects either "Send book" or "Get Book" in box 148 from the client program main menu. The user next chooses from a menu of remote locations in box 150, and in the event there is only one remote location this step may be omitted. After the desired remote location has been chosen, the client software then contacts the remote location and performs user verification in box 152. This could be a simple password check, an encrypted password check, challenge and response, the presentation of a digital certificate or any other means.

Once the user has been verified, the program proceeds to a menu in box 154 of areas and levels available on the remote site. The user then chooses an area and level. However, this choice must be cleared through the permissions checking facility of the remote location. If the user has proper access based on the previous sign-in box 152, the remote location in box 146 will respond with a list a list of all content in the chosen area/level. The user can then choose a book or individual pages from one or many books in box 158. The user may also select the test mode in which a portion of the page of the book is hidden. Again, the remote location will check in box 156, whether the user can access the actual content referred to by the list. If the permissions check returns successfully, then the user can then begin to upload or download the selected items in box 168. This upload or download can be recorded in a database listing all pages and uploads/downloads thereof in box 166. In the event that the user has downloaded a book in the test mode, the user then operates the program to complete the pages of the test as described above. The user may then either download the master book and compare his or her answers with the master, or upload his or her answers such that they are available to a third party for grading. Once the user has finished, the program then returns to the main menu.

The present invention can be implemented with any suitable computer system. An exemplary computer system will be described for illustration purposes only and the concepts equally apply to other systems including systems which have architectures dissimilar to the architectures described herein.

A useful computer system includes a central processing unit (CPU) implemented with a conventional microprocessor, a random access memory for temporary storage of information and a read only memory for permanent storage of information. The memory is controlled by a memory controller. A bus is provided to interconnect the components of the computer system and a bus control is provided for controlling the bus. The system can also include an interrupt controller used for receiving and processing various input signals from the system components. Any form of mass storage media may be provided such as diskette, CD ROM, hard drive, or later developed memory components. The computer system may exchange data and software via removable media such as diskettes or CD ROMs or by downloading the data or software from the storage media of a server or other computer network with the computer system.

The user may input instructions and data to the computer system by any known device such as keyboard, mouse, audio transducer, pen, touchpad and/or tabloid.

Output perceivable by the user can be in the form of visual display, audio signal or printed or combinations of these above. The computer system will include components and controllers known in the art to provide such outputs.

Operation of the computer system is generally controlled and coordinated by operating system software such as Windows 98, sold by Microsoft Corporation, Redmond, Wash. or any other known operating system. The operating system controls allocation of system resources and performs tasks such as scheduling, processing, memory management, networking, etc. The operating system resident in the system memory and running on the CPU coordinates the operation of the computer system. The present invention may be implemented with any number of commercially available operating systems such as OS/2, Unix, etc. The present invention has been described in the preferred embodiment designed for operation on Microsoft Windows 2000. A computer system having the program loaded thereon is used to create the screen books. The functions of the program may be distributed in a network environment such as an intranet or an internet.

I claim:

1. A computer program comprising:
Program code for prompting a user to input textual information for association with a computer output image displayed on a computer screen;
Program code responsive to an input command to automatically, without direct human intervention, reset the resolution of the computer screen from a first resolution to a second resolution, save the first resolution, automatically, without direct human intervention, capture an image representing at least a portion of the computer screen at the second resolution, subsequently restore the computer screen to the saved first screen resolution, the portion of the computer screen being defined both by received data and operation of a computer program, and save said image in a predetermined image file format;
Program code which automatically without direct human intervention associates said textual input with said saved image to create a page associating said text and said image in a common internet language; and
Program code to automatically without direct human intervention store said page in a memory.

2. A program of claim 1 further comprising:
Program code to automatically restore said computer screen to said saved first resolution after said image is captured.

3. A program of claim 1, further comprising:
program code to allow placement of indicia on said computer screen prior to capture of the image.

4. A program of claim 1, wherein:
said common internet language is one which allows the inputted information to be stored as data fields.

5. A program of claim 4, further comprising:
program code which allows selected data fields of said page to be displayed to users while other data fields are hidden from the user display.

6. A program of claim 4, further comprising program code to automatically assign page numbers to each said page created and to allow selected ones of a plurality of pages to be displayed by the user in any desired order.

7. A program of claim 1, wherein said common internet language is HTML.

8. A program of claim 1, wherein said common internet language is XML.

9. A program of claim 1, further comprising:
program code containing a database of stored master pages, said pages having text and associated images thereon;
program code to allow the user to display either the text or image portion of said stored master pages; and
program code to automatically associate at least said displayed portion of said master page with an input from the user to create an answer page having both a text portion and an image portion.

10. A program of claim 9, further comprising:
program code to allow retrieval of at least one of said master pages and to compare said master page with said answer page.

11. A program of claim 1, further comprising
program code to retrieve a portion of a previously saved page;
program code for directly combining at least said portion of a previously saved page with said input textual information or an image not from said previously saved page to create a new page; and
program code allowing the full previously saved page to be compared with said new page.

12. A method, comprising the steps of:
receiving input textual information for association with a computer output image displayed on a computer screen in response to an input command;
receiving an image representing at least a portion of a computer screen, automatically, without direct human intervention, resetting the resolution of the computer screen from a first resolution to a second resolution, saving the first resolution, automatically, without direct human intervention, saving the image into a converted predetermined image format in response to an input command, and restoring the computer screen to the saved first resolution, the portion of the computer screen being defined both by received data and operation of a computer program; and
automatically, without direct human intervention combining said textual information with a reference to said saved image to create a page containing said text and reference to said image in a common internet language.

13. A method of claim 12, further comprising the steps of:
maintaining a database of master books, each book comprising at least one master page;
accessing individual pages of said master books;
retrieving a portion of at least one of said master pages, each master page having content illustrating a computer screen having correct content; and
directly combining at least said retrieved portion with input textual information or an image not from said at least one of said master pages, to create an answer page.

14. A method of claim 13, further comprising:
providing on-line access to at least one of the complete pages of said master book;
and providing the ability to compare said complete page of said master book with said answer page.

15. A method of claim 13 further comprising:
maintaining a database of authorized users; and
providing the ability to deny access to unauthorized users.

16. A method of claim 13, comprising:
providing a database of existing pages;
accessing one or more pages in the database;
creating new pages using one or more of said input textual information and image; and
combining new and existing pages into a book, said book having at least one page.

17. A method of claim 16, further comprising:
providing the ability to store said book of combined new and existing pages in said database.

18. A method of claim 12, further comprising the steps of:
maintaining a database containing pages of two or more books, each book having at least one page;
accessing individual pages from said books;
combining one or more individual pages from each of said books to create a new book, and
providing the ability to store said new book in said database.

19. A method of claim 18 further comprising:
providing the ability to transfer said book to a remote location.

20. A method of claim 18, further comprising:
combining said automatically combined page with individual pages from each of said books to create a new book.

21. A method of claim 12, further comprising the steps of:
providing the ability to store in a database individual pages having associated authorship therewith;
providing the ability to access each of said pages having associated copyright information therewith; and
providing the ability to combine individual pages having copyright information therewith from two or more authors to create a book in which the authorship information for each page is maintained associated therewith.

22. A, method of claim 21, further comprising:
providing a database of authorized users; and
providing the ability to limit said ability to access each of said pages to said authorized users.

23. A, method of claim 22 wherein said associated authorship information includes copyright use information and further comprises:
providing the ability to limit access to each of said pages in accordance with the copyright use information associated with said page.

24. A system comprising:
means for automatically, without direct human intervention, associating text received from a user and a stored image representing at least a portion of a computer display, the stored image being generated by automatically, without direct human intervention, saving a first screen resolution of the computer display, resetting the resolution of the computer display from the first resolution to a second resolution, capturing the computer display image at the second resolution, and resetting the computer display to the saved first resolution, said image comprising content defined by both data and operation of a computer program, to create an original page in a common internet language, said page being displayable in a format containing said text and said image.

25. A system of claim 24, further comprising:
means for associating two or more of said original pages as a book.

26. A system of claim 24, further comprising:
means for displaying only a portion of a said original page to a user;
means to input data to be associated with said portion of said original page; and
means to automatically associate at least said portion of said original page and said data in a common Internet language to create an answer page.

27. A system of claim 26, further comprising:
means to permit comparison of a said original page with said answer page.

28. A system of claim 24, further comprising:
means for displaying a portion of a master page having text and image information, said master page being in a common internet language, said master page comprising a correct content illustrating a computer screen comprising content defined by both data and operation of a computer program.

29. A system of claim 28, further comprising:
means to display said master page and said original page so that they can be compared.

30. A system comprising:
an input to receive textual information;
an input prompting capture of an image representing at least a portion of a computer screen, the system automatically, without direct human intervention, saving a first resolution, resetting the resolution of the computer screen from the first resolution to a second resolution, capturing the image at the second resolution, and restoring the saved first resolution;
a processor for converting the captured image to a predetermined image format, saving the converted captured image, said saved image comprising elements defined by both data and by operation of a computer program, and automatically, without direct human intervention, combining said textual information with a reference to said saved image to create a page containing said textual information and reference to said image in a common internet language; and
means for storing one or more pages having textual information and a reference to an image in a database; and
means for making available said one or more pages available for display.

31. A system of claim 30, further comprising:
means for receiving additional pages and for adding said additional pages to said database.

32. A system of claim 30 further comprising:
means for associating predetermined groups of pages into books.

33. A system comprising:
an output for presenting a page having text and media information contained on said original page defined in accordance with a common internet language;
a processor responsive to a user input for creating in automated fashion additional pages having text and associated media information representing at least a portion of a computer media output, comprising content defined by both data and operation of a computer program, said page being defined in accordance with a common internet language, said processor automatically, without direct human intervention, storing a first screen resolution, resetting the computer screen from the first screen resolution to a second screen resolution, capturing the associated media information by receiving an image representing at least a portion of a computer screen, and restoring the screen to the stored first screen resolution; and
means for transmitting said additional pages to a remote site.

* * * * *